(12) United States Patent
Stollenwerk et al.

(10) Patent No.: US 6,905,776 B1
(45) Date of Patent: Jun. 14, 2005

(54) CONDUCTIVE TRANSPARENT LAYERS AND METHOD FOR THEIR PRODUCTION

(75) Inventors: Johannes Stollenwerk, Köln (DE); Andreas Klöppel, Glauburg (DE); Marcus Bender, Solms (DE)

(73) Assignee: BPS Alzenau GmbH (DE)

( * ) Notice: Subject to any disclaimer, the term of this patent is extended or adjusted under 35 U.S.C. 154(b) by 451 days.

(21) Appl. No.: 09/686,417

(22) Filed: Oct. 11, 2000

(30) Foreign Application Priority Data

Oct. 11, 1999 (DE) .......................................... 199 48 839

(51) Int. Cl.⁷ .......................... B32B 3/00; B32B 15/00; B32B 15/04; B32B 19/00; B05D 3/02
(52) U.S. Cl. ........................ 428/469; 428/432; 428/433; 428/457; 428/697; 427/226
(58) Field of Search ........................... 427/226; 428/469, 428/433, 457, 432, 697

(56) References Cited

U.S. PATENT DOCUMENTS

| | | |
|---|---|---|
| 4,346,324 A | 8/1982 | Yoldas |
| 4,464,223 A | 8/1984 | Gorin |
| 4,497,700 A | 2/1985 | Groth et al. |
| 4,565,719 A | 1/1986 | Phillips et al. |
| 4,690,871 A | 9/1987 | Gordon |
| 4,812,712 A | 3/1989 | Ohnishi et al. |
| 5,073,451 A | 12/1991 | Iida et al. |
| 5,091,244 A | 2/1992 | Biornard |
| 5,110,662 A | 5/1992 | Depauw et al. |
| 5,183,700 A | 2/1993 | Austin |
| 5,270,858 A | 12/1993 | Dickey |
| 5,271,960 A | 12/1993 | Proscia |
| 5,635,245 A | 6/1997 | Kimock et al. |
| 5,667,880 A | 9/1997 | Okaniwa |
| 5,798,182 A | 8/1998 | LeFebvre et al. |

FOREIGN PATENT DOCUMENTS

| | | |
|---|---|---|
| DE | 1195135 | 2/2001 |
| EP | 0803587 | 9/1991 |
| EP | 0456487 | 11/1991 |
| EP | 0520720 | 12/1992 |
| EP | 0593883 | 4/1994 |
| EP | 0638528 | 2/1995 |
| EP | 0747330 | 12/1996 |
| GB | 2126256 | 3/1984 |
| GB | 2344600 | 6/2000 |
| JP | 9176841 | 8/1997 |
| WO | 9202364 | 2/1992 |
| WO | 9720962 | 12/1996 |

OTHER PUBLICATIONS

"Asymmetric Bipolar Pulsed DC," Jeff Sellers, Vakuum in Forschung und Praxis (1996) Nr. 3, pp. 171–174.
Database WPI, Section Ch, Week 199015, Derwent Publications Ltd., London, GB; AN 1990–113453, XP00219490 & JP 02 066158 A (unitika Ltd), Mar. 6, 1990 Zusammenfassung.

*Primary Examiner*—Cynthia H. Kelly
*Assistant Examiner*—J. Ferguson
(74) *Attorney, Agent, or Firm*—Price, Heneveld, Cooper, DeWitt & Litton

(57) ABSTRACT

On a glass substrate, a base layer of indium cerium oxide is deposited, and on this a thin copper-containing silver layer, both produced by means of DC sputtering. On top there is another indium cerium oxide layer, which is produced by means of AC-superimposed DC sputter deposition. This layer system boasts very low surface resistivity combined with high transparency in the visible part of the spectrum, which means it has a high Haacke quality factor.

16 Claims, 1 Drawing Sheet

CONDUCTIVE TRANSPARENT LAYERS AND METHOD FOR THEIR PRODUCTION

FIELD OF THE INVENTION

This invention relates to conductive transparent layers and to a method for the production of these conductive transparent layers.

BACKGROUND OF THE INVENTION

Conductive transparent layers today have many applications in display-devices, optoelectronics and as architectural glass. For these applications it is desirable, on the one hand, that transmittance in the visible part of the spectrum is as high as possible, and on the other hand, that conductivity is as high as possible or surface resistivity as low as possible. As a measure of the quality of conductive transparent layers, the Haacke quality factor $\Phi_{TC}=T^{10}/R_s$ can be used, which is defined in the *Journal of Applied Physics*, Vol. 47, pages 4086–4089 (1976). "T" stands for the optical transmittance of the layer (as a fraction of the incident radiation) and $R_s$ for the surface resistivity in $_{sq}$. For example, a layer with a transmittance of 90% and a surface resistivity of $3_{sq}$ has a Haacke quality factor of $0.116^{-1}$. A layer with a transmittance of 80% and a surface resistivity of $5_{sq}$ has a quality factor of $0.021^{-1}$.

Another important property of such a layer system is its etching performance. This depends on its chemical composition and its thickness. For a short etching time and good edge sharpness, it is important that the layer is as thin as possible, i.e. less than 100 nm.

To obtain high quality factors, it is beneficial to combine layer systems, of oxidic and metallic layers. For example, the interposition of very thin layers of silver between thin oxide layers is known. As a result of being sandwiched between. oxide layers, the silver layer is stabilized and protected on the one hand, while on the other hand, its reflection is reduced and transmittance thus increased. These layer combinations have the additional advantage of a low overall layer thickness, namely 100 nm or less. A layer system of indium tin oxide, by comparison, which is of comparable resistivity, is more than 500 nm thick (S. H. Shin and co-authors, Thin Solid Films 341 (1999) 225–229). Consequently, etching processes of the kind typically used for manufacturing displays are faster and the extent of undercut is less.

Layer systems of this kind are described, for example, in: DP 0 599 071 A1, JP 10062602 A and in the article by K. K. Choi and co-authors, Thin Solid Films 341 (1999) 152–155.

In the EP 0 599 071 A1 a layer system is described with the layer sequence indium tin oxide, silver or various silver alloys, indium tin oxide. By annealing at 300° C. for an hour, layers can be produced with a surface resistivity of $3.2_{sq}$ and, at the same time, good transmittance in the visual part of the spectrum. For the wavelengths 435, 545 and 610 nm, a mean Haacke quality factor of 0.066 is obtained. The subsequent temperature treatment necessary for display applications is, however, a disadvantage, since it entails an additional. step.

In the JP 10062602 A a similar layer system is describe. Here, a thin silver layer containing at least 1.5 atomic percentage added gold is embedded between oxide layers consisting of tin oxide, indium oxide and small additions of other oxides. Layers are obtained which have a surface resistivity of $4-20_{sq}$ and high transparency at 550 nm. The higher costs incurred due to addition of gold and the relatively high surface resistivity must be seen as disadvantages.

In Thin Solid Films 341, K. K. Choi and co-authors describe a layer system consisting of indium tin oxide followed by a silver layer and, as covering layer, indium tin oxide again. To improve conductivity, the indium tin oxide layers are deposited at 200° C., but the silver layer at room temperature. However, as a result of heating prior to deposition of the second layer of indium tin oxide, the optical transmittance and the electrical conductivity of the silver layer are impaired. In the best of cases, layers with a surface resistivity of $4_{sq}$ and 90% transmittance at 550 nm are obtained.

It is also known that through selective choice of materials and coating parameters, transparent, conductive layer systems can be produced which have a resistivity of $2.93_{sq}$, transmittance values (measured against air) of 89.2% at 435 nm, 92.4% at 545 nm and 82.2% at 610 nm, and an overall layer thickness of 86.5 nm. For the three wavelengths quoted, this transparent conductor has a mean Haacke quality factor of 0.104 ohm$^{-1}$.

In the field of display devices, transparent electrodes with even lower surface resistivity combined with high transmittance in the visible part of the spectrum, i.e. a high Haacke quality factor, are needed for large-area flat LCD displays and for computer monitors with screen diagonals preferably over 17". This is necessary because of the image size, the high resolution and pixel count, as well as the speed of these displays. These requirements can no longer be met by the methods known to date.

SUMMARY OF THE INVENTION

The object of this invention is to overcome the disadvantages of the prior art and, in particular, to achieve an even lower surface resistivity combined with a high Haacke quality factor.

This object is established by means of a layer system according to claim 1, and a method according to claim 6. Additional preferred embodiments of the invention are described in the dependent claims.

DESCRIPTION OF THE PREFERRED EMBODIMENT

Figure 1:
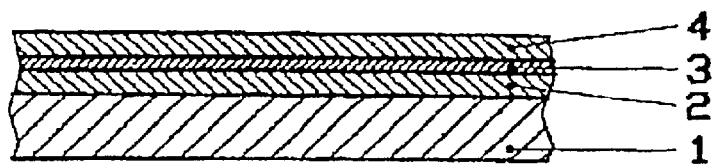
FIG. 1 is a diagram showing a cross section through a layer system according to the invention.

A layer system according to the preferred embodiment of the invention comprises at least two oxide layers with a silver layer interposed between them, and has a surface resistivity of less than $2.9_{sq}$, preferably $2.5_{sq}$ or less, combined with a Haacke quality factor averaged over the wavelengths 435, 545 and 610 nm—in excess of $0.085^{-1}$.

For reasons of color neutrality it is beneficial if, for a surface resistivity of $2.5_{sq}$, the optical transmittance at 435 nm is at least 89%, at 545 nm at least 88% and at 610 nm at least 75%. This ensures that the coating appears as neutral as possible.

Especially good results are obtained if the two oxide layers are advantageously selected to be less than 50 nm thick, preferably between 30 and 40 nm, and the silver layer less than 20 nm thick, preferably 15 nm.

Glare suppression by the oxide layers is especially good if, in addition to indium, the oxide layer contains up to 10 at. % cerium.

The stability of the silver layer is enhanced by addition of up to 10 wt. % copper. Additions of 0.5 to 3%, and, in particular, 0.5 to 1%, are especially effective.

During production of the layer systems described it is of crucial importance, as described in claim 6 and additional dependent claims, that the second oxide layer is not deposited by pure DC sputtering but by pulsed DC sputtering or AC-superimposed DC sputtering. AC-superimposition can be effected, for example, by coupling the output signal via a filter to the sputter source supplied with DC current. An alternative method is, for example, to suitably modulate or chop the DC supply current. Different modulations are thus possible.

To achieve especially good results, the AC frequency should be between 1 and 50 MHz, preferably between 10 and 20 MHz.

It is also beneficial if the AC component, defined by the ratio of the DC and AC power supplies, is adjusted between 10 and 90%, preferably between 30 and 50%.

A total power density (AC and DC) of 1 to 3 W/cm$^2$, preferably of 2 to 2.2 W/cm$^2$, proved especially suitable.

The preferred sputtering method is magnetron sputtering.

The advantages of the method of the invention can be summarized as follows:

By maintaining the high conductivity of the thin silver layer by means of the way in which the second oxide layer is applied, optical transmittance can be kept high. Without the method of the invention, it would be necessary, it would be necessary to increase the thickness of the silver layer in order to obtain this conductivity, and doing this would unavoidably lead to a pronounced reduction in transmittance and thus to a significant deterioration in the Haacke quality factor.

The production of such layers using the method of the invention will now be described using the following example.

The glass substrates, of conventional thin float glass or broad window glass, are cleaned in the usual manner and then introduced into a sputtering unit. The vacuum chamber is pumped down and, once the necessary vacuum has been generated, deposition of the first oxide layer comprising indium oxide and cerium oxide begun. This oxide layer is ejected from an oxide target in a partially reactive DC sputtering process, i.e. in an argon atmosphere of approximately 2.2×10$^{-3}$ hPa with a maximum oxygen addition of 5%. This sputtering process is a purely DC process. Typical sputtering rates are 5–8 nm×m/min×cm$^2$/W. Subsequently, the silver layer is sputter-deposited in a pure, non-reactive DC process. Typical sputtering rates here are 12–15 nm×m/min×cm$^2$/W. In the next step, the second oxide layer is sputter-deposited in an AC-superimposed DC sputtering process. The AC component, defined by the ratio of the DC and AC power supplies, is between 30 and 50%. The AC frequency is 13.56 MHz. After completion of the sputtering process the coated glass substrates are exposed to the air, either by removing them from the chamber through a vacuum lock or by flooding the chamber with air. In a subsequent etching step the substrates are then structured and processed further to displays.

In the following, embodiments of the invention are illustrated by reference to FIGS. 1 and 2.

In FIG. 1, reference number 1 indicates the glass substrate onto which the layer system of the invention is deposited, 2 is an indium cerium oxide layer, 3 a copper-doped silver layer and 4 a covering indium cerium oxide layer.

The glass substrate 1 is, for example, a commercially available float glass of 1.1 mm thickness. However, different glass thicknesses and different types of glass, e.g., broad window glass, can also be used.

An oxide layer 2 with a geometrical thickness of 30–37 nm is deposited onto the glass by means of partially reactive DC sputtering from an oxide target consisting preferably of 90–95 at. % indium and 5–10 at. % cerium.

In a purely DC sputtering process conducted in an argon atmosphere, a silver layer 3 with a thickness of 15 nm and containing 0,5–10% added copper, preferably 0.5–3% and best of all 0.5–1% copper, is deposited on the oxide layer 2.

A second indium cerium oxide layer 4, likewise with a geometrical thickness of 30–37 nm, is deposited directly onto the silver/copper layer 3. This is done, however, by means of an AC-superimposed DC sputtering process. The AC component, defined by the ratio of the DC and AC power supplies, is between 10–90%, preferably between 30–50%. The AC frequency is between 1 and 50 MHz, preferably between 10 and 20 MHz.

Deposition of the silver/copper layer may optionally be followed by deposition of a protective layer of oxides of titanium alloys or nickel alloys. This is done by means of DC magnetron sputtering.

Figure 2:
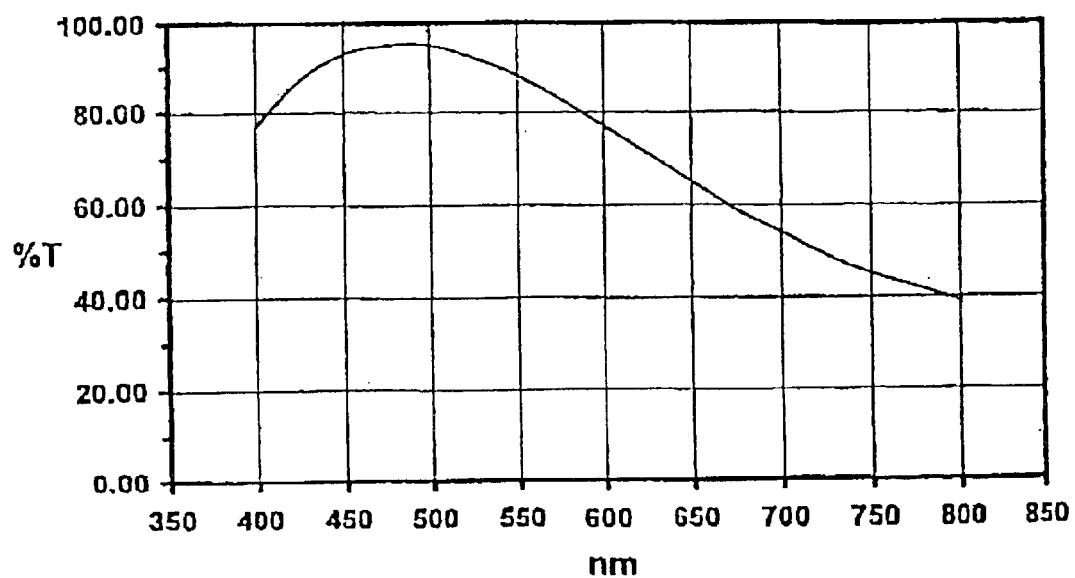
FIG. 2 shows the optical transmittance—measured against air—of a layer system according to the invention and having a surface resistivity of $2.5_{sq}$ in the visible part of the spectrum.

In FIG. 2 the optical transparency (measured against air) of a layer system according to the invention and having a surface resistivity of 2,5$_{sq}$ is shown as a function of the wavelength in the spectral region from 400–800 nm. The transparency at 435 nm is 89.8%, at 545 nm 88.4% and at 610 nm 75.4%. The mean Haacke quality factor for these three wavelengths is 0.092$^{-1}$.

What is claimed is:

1. A conductive transparent layer system with two oxide layers and a silver layer interposed therebetween on a substrate, characterized in that with a surface resistivity R$_s$ of less than 2.9$_{sq}$, the mean Haacke quality factor ($\Phi_{TC}$= T$^{10}$/R$_s$) of the layer system for the wavelengths 435, 545 and 610 nm is greater than 0.085$^{-1}$.

2. The layer system of claim 1, characterized in that with a surface resistivity of 2.5$_{sq}$, the transparency T at 435 nm is at least 89%, at 545 nm at least 88% and at 610 nm at least 75%.

3. The layer system according to claim 1, characterized in that the layer system is less than 100 nm thick, with the silver layer being less than 20 nm thick, and the two oxide layers being less than 50 nm thick.

4. The layer system according to claim 3, characterized in that the oxide layers contain about 90–95% indium and about 5–10% cerium.

5. The layer system according to claim 4, characterized in that the silver layer contains up to 10 wt. % copper.

6. The layer system according to claim 1, characterized in that the layer system is less than 100 nm thick, with the silver layer being less than 20 nm thick, and the two oxide layers being less than 50 nm thick.

7. The layer system according to claim 6, characterized in that the oxide layers contain about 90–95% indium and about 5–10% cerium.

8. The layer system according to claim 7, characterized in that the silver layer contains up to 10 wt. % copper.

9. The layer system according to claim 1, characterized in that the oxide layers contain about 90–95% indium and about 5–10% cerium.

10. The layer system according to claim 9, characterized in that the silver layer contains up to 10 wt. % copper.

11. The layer system according to claim 1, characterized in that the silver layer contains up to 10 wt. copper %.

12. layer system according to claim 1 in which the second oxide layer is deposited by means of pulsed DC sputtering or AC-superimposed DC sputtering.

13. The layer system of claim 12, characterized in that the frequency of the superimposed AC is between 1 and 50 MHz.

14. The layer system of claim 12, characterized in that the AC component, defined by the ratio of the DC and AC power supplies, is between 10–90%.

15. The layer system of claim 12, characterized in that the total power density (AC and DC) is in the range from 1–3 W/cm$^2$.

16. The layer system of claim 12, characterized in that magnetron sputtering is chosen as sputtering method.

* * * * *

UNITED STATES PATENT AND TRADEMARK OFFICE
CERTIFICATE OF CORRECTION

PATENT NO. : 6,905,776 B1
DATED : June 14, 2005
INVENTOR(S) : Johannes Stollenwerk et al.

It is certified that error appears in the above-identified patent and that said Letters Patent is hereby corrected as shown below:

Column 1,
Line 58, after "additional" delete "." (period).
Line 59, "describe" should be -- described --.

Column 3,
Line 30, delete "it would be necessary," (first occurrence).

Column 4,
Line 11, "0,5-10%" should be -- 0.5-10% --.
Line 27, "2,5 sq" should be -- 2.5 sq --.

Column 5,
Line 1, before "layer" insert -- The --.

Signed and Sealed this

Thirteenth Day of December, 2005

JON W. DUDAS
*Director of the United States Patent and Trademark Office*